US008962187B2

(12) United States Patent
Goto et al.

(10) Patent No.: US 8,962,187 B2
(45) Date of Patent: *Feb. 24, 2015

(54) NEGATIVE ELECTRODE ACTIVE MATERIAL FOR LITHIUM ION SECONDARY BATTERY AND METHOD FOR PRODUCING THE SAME

(71) Applicant: Panasonic Corporation, Osaka (JP)

(72) Inventors: Natsumi Goto, Hyogo (JP); Takashi Takeuchi, Osaka (JP); Masaki Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,045

(22) Filed: Dec. 11, 2012

(65) Prior Publication Data

US 2013/0209884 A1 Aug. 15, 2013

Related U.S. Application Data

(60) Provisional application No. 61/597,536, filed on Feb. 10, 2012, provisional application No. 61/680,916, filed on Aug. 8, 2012.

(51) Int. Cl.
*H01M 4/00* (2006.01)
*H01M 4/525* (2010.01)
(Continued)

(52) U.S. Cl.
CPC .............. *H01M 4/525* (2013.01); *H01M 4/505* (2013.01); *H01M 4/485* (2013.01); *C01G 23/005* (2013.01); *C01G 45/1292* (2013.01); *C01G 49/0027* (2013.01); *H01M 4/131* (2013.01); *Y02E 60/122* (2013.01); *C01P 2002/54* (2013.01); *C01P 2002/72* (2013.01); *C01P 2004/61* (2013.01); *C01P 2006/11* (2013.01)
USPC ........................................... 429/221; 429/224

(58) Field of Classification Search
USPC ............ 429/219, 220, 221, 224, 231.2, 231.3
See application file for complete search history.

(56) References Cited

U.S. PATENT DOCUMENTS

| 2012/0045693 A1* | 2/2012 | Eom ............................. 429/220 |
| 2012/0214069 A1* | 8/2012 | Goto et al. ................. 429/231.2 |
| 2012/0270105 A1* | 10/2012 | Goto et al. ..................... 429/219 |

FOREIGN PATENT DOCUMENTS

| JP | 2000-156229 A | 6/2000 |
| JP | 2001-185141 A | 7/2001 |

(Continued)

OTHER PUBLICATIONS

Machine Translation of JP-2003297433A.*

(Continued)

*Primary Examiner* — Stewart Fraser
(74) *Attorney, Agent, or Firm* — McDermott Will & Emery LLP (57) ABSTRACT

A negative electrode active material for lithium ion secondary batteries of the present invention includes a lithium-titanium composite oxide that has a composition represented by $Li_4Ti_{5-x}Fe_xO_{12}$ (where x satisfies $0<x\leq0.3$) or $Li_4Ti_{5-y}Mn_yO_{12}$ (where y satisfies $0<y\leq0.3$) and that has an average particle diameter of primary particles which is not less than 1 μm.

5 Claims, 2 Drawing Sheets

(51) Int. Cl.
*H01M 4/505* (2010.01)
*H01M 4/485* (2010.01)
*C01G 23/00* (2006.01)
*C01G 45/12* (2006.01)
*C01G 49/00* (2006.01)
*H01M 4/131* (2010.01)

(56) References Cited

FOREIGN PATENT DOCUMENTS

| JP | 2001-196061 A | 7/2001 |
| JP | 2002-008658 A | 1/2002 |
| JP | 2003297433 A * | 10/2003 |

OTHER PUBLICATIONS

International Search Report issued in corresponding PCT Application No. PCT/JP2012/007799, dated Mar. 19, 2013.

P. Kubiak, et al.: "Phase transition in the spinel Li4Ti5O12 induced by lithium insertion Influence of the substitutions Ti/V, Ti/Mn, Ti/Fe", Journal of Power Sources, 2003, vol. 119-121, pp. 626-630.

A.D. Robertson, et al.: "New inorganic spinel oxides for use as negative electrode materials in future lithium-ion batteries", Journal of Power Sources, 1999, vol. 81-82, pp. 352-357.

* cited by examiner

NEGATIVE ELECTRODE ACTIVE MATERIAL FOR LITHIUM ION SECONDARY BATTERY AND METHOD FOR PRODUCING THE SAME

BACKGROUND OF THE INVENTION

1. Field of the Invention

The present invention relates to an inorganic material used as a negative electrode active material for lithium ion secondary batteries, and to a method for producing the inorganic material.

2. Related Background Art

In recent years, various types of lithium ion secondary batteries have been developed. Conventionally, carbon materials have been mainly used as negative electrode active materials for lithium ion secondary batteries. However, lithium-titanium composite oxide materials have been newly developed, and are drawing attention. For example, a lithium ion secondary battery that uses $LiCoO_2$ as a positive electrode active material and that uses $Li_4Ti_5O_{12}$ as a negative electrode active material has been already put into practical use.

$Li_4Ti_5O_{12}$ is a material having a spinel type crystal structure, and is capable of repeatedly absorbing or releasing Li. Therefore, $Li_4Ti_5O_{12}$ can be used as an active material for a lithium ion secondary battery. $Li_4Ti_5O_{12}$ absorbs or releases Li at a potential of about 1.5 V when the standard oxidation-reduction potential of lithium ($Li/Li^+$) is defined as a reference. Accordingly, it can be thought that using $Li_4Ti_5O_{12}$ as a negative electrode active material for a lithium ion secondary battery can realize a lithium ion secondary battery of high safety that is unlikely to cause precipitation of lithium metal at the negative electrode even when reaction overpotential occurs such as due to quick charge. Furthermore, $Li_4Ti_5O_{12}$ has good cycle characteristics since the lattice expansion associated with charge and discharge is very small.

Materials having various characteristics improved by adding an additive element to $Li_4Ti_5O_{12}$ have also been developed. For example, JP 2001-185141 A discloses that $Li_{4/3}Ti_{5/3-x}Fe_xO_4$ ($0<x\leq0.2$) in which part of Ti elements of $Li_4Ti_5O_{12}$ is substituted with Fe has an improved electron conductivity compared to $Li_4Ti_5O_{12}$.

SUMMARY OF THE INVENTION

However, conventional negative electrode active materials, such as $Li_4Ti_5O_{12}$ and $Li_{4/3}Ti_{5/3-x}Fe_xO_4$ that are synthesized by conventional processes, are required to be further improved, in order that both a high filling density and high input characteristics can be achieved when the materials are processed into electrodes.

In view of the above circumstances, the present invention aims to provide a negative electrode active material for lithium ion secondary batteries that exhibits a high filling density when processed into an electrode and that allows realization of a lithium ion secondary battery having high input characteristics.

The present invention provides a negative electrode active material for lithium ion secondary batteries, the negative electrode active material including a lithium-titanium composite oxide which has a composition represented by $Li_4Ti_{5-x}Fe_xO_{12}$ (where x satisfies $0<x\leq0.3$) or $Li_4Ti_{5-y}Mn_yO_{12}$ (where y satisfies $0<y\leq0.3$) and in which primary particles have an average particle diameter not less than 1 μm.

DETAILED DESCRIPTION OF THE INVENTION

The inventors of the present invention have found that there are problems that need to be solved in the conventional negative electrode active materials mentioned in "Related Background Art", such as $Li_4Ti_5O_{12}$ and $Li_{4/3}Ti_{5/3-x}Fe_xO_4$ that are synthesized by conventional processes. Specifically, $Li_4Ti_5O_{12}$ and $Li_{4/3}Ti_{5/3-x}Fe_xO_4$ that are synthesized by conventional processes have very small particle diameters of primary particles. Therefore, these materials have a problem in that the filling density in an electrode is lowered, and the energy density of the electrode is reduced. If, for example, the particle diameter of $Li_4Ti_5O_{12}$ is increased in order to solve the above problem, i.e., in order to realize a high filling density, there arises another problem in that the input characteristics deteriorate with the increase in the particle diameter.

After a great deal of consideration of the above problems, the inventors of the present invention have arrived at providing a negative electrode active material for lithium ion secondary batteries that exhibits a high filling density when processed into an electrode and that allows realization of a lithium ion secondary battery having high input characteristics, and at providing a method for producing the negative electrode active material.

A first aspect of the present invention provides a negative electrode active material for lithium ion secondary batteries, the negative electrode active material including a lithium-titanium composite oxide which has a composition represented by $Li_4Ti_{5-x}Fe_xO_{12}$ (where x satisfies $0<x\leq0.3$) or $Li_4Ti_{5-y}Mn_yO_{12}$ (where y satisfies $0<y\leq0.3$) and in which primary particles have an average particle diameter not less than 1 μm.

The negative electrode active material for lithium ion secondary batteries of the first aspect includes the lithium-titanium composite oxide in which the average particle diameter of the primary particles is not less than 1 μm, and therefore, the negative electrode active material can enhance the filling density in an electrode when processed into the electrode. In addition, since the lithium-titanium composite oxide included in the negative electrode active material of the first aspect has a composition represented by $Li_4Ti_{5-x}Fe_xO_{12}$ (where x satisfies $0<x\leq0.3$) or $Li_4Ti_{5-y}Mn_yO_{12}$ (where y satisfies $0<y\leq0.3$), high input characteristics can be realized even if the particle diameter is increased. Therefore, the negative electrode active material of the first aspect makes it possible to achieve both a high filling density and high input characteristics.

A second aspect of the present invention provides the negative electrode active material for lithium ion secondary batteries according to the first aspect, in which the x satisfies $0<x\leq0.2$. The negative electrode active material of the second aspect can improve the electrode capacitance density.

A third aspect of the present invention provides the negative electrode active material for lithium ion secondary batteries according to the first aspect, in which the y satisfies $0<y\leq0.2$. The negative electrode active material of the third aspect can improve the electrode capacitance density.

A fourth aspect of the present invention provides the negative electrode active material for lithium ion secondary batteries according to any one of the first to third aspects, in which the average particle diameter of the primary particles of the lithium-titanium composite oxide is not less than 1 μm and not more than 5 μm. The negative electrode active material of the fourth aspect can make it easier to realize both a high filling density and high input characteristics.

A fifth aspect of the present invention provides a method for producing a negative electrode active material for lithium ion secondary batteries. The method includes the steps of: uniformly mixing: at least one source of lithium selected from LiOH, LiOH hydrate, and $Li_2CO_3$; titanium oxide; and at least one source of Fe selected from $Fe_2O_3$ and FeOOH, so as to obtain a mixture; and calcining the mixture at a temperature not lower than 900° C. and not higher than 1000° C.

With the production method of the fifth aspect, it is possible to easily synthesize a negative electrode active material for lithium ion secondary batteries that exhibits a high filling density when processed into an electrode and that allows realization of a lithium ion secondary battery having high input characteristics.

A sixth aspect of the present invention provides a method for producing a negative electrode active material for lithium ion secondary batteries. The method includes the steps of: uniformly mixing: at least one source of lithium selected from LiOH, LiOH hydrate, and $Li_2CO_3$; titanium oxide; at least one source of Fe selected from $Fe_2O_3$ and FeOOH; and at least one molten salt material selected from LiCl, KCl, $Li_2SO_4$, and $LiClO_4$, so as to obtain a mixture; calcining the mixture at a temperature not lower than 500° C. and not higher than 1000° C.; and washing the resultant calcined product to remove the molten salt material.

With the production method of the sixth aspect, it is possible to easily synthesize a negative electrode active material for lithium ion secondary batteries that exhibits a high filling density when processed into an electrode and that allows realization of a lithium ion secondary battery having high input characteristics.

A seventh aspect of the present invention provides a method for producing a negative electrode active material for lithium ion secondary batteries. The method includes the steps of: uniformly mixing: at least one source of lithium selected from LiOH, LiOH hydrate, and $Li_2CO_3$; titanium oxide; and at least one source of Mn selected from $MnO_2$ and $MnCO_3$, so as to obtain a mixture; and calcining the mixture at a temperature not lower than 900° C. and not higher than 1000° C.

With the production method of the seventh aspect, it is possible to easily synthesize a negative electrode active material for lithium ion secondary batteries that exhibits a high filling density when processed into an electrode and that allows realization of a lithium ion secondary battery having high input characteristics.

An eighth aspect of the present invention provides a method for producing a negative electrode active material for lithium ion secondary batteries. The method includes the steps of: uniformly mixing: at least one source of lithium selected from LiOH, LiOH hydrate, and $Li_2CO_3$; titanium oxide; at least one source of Mn selected from $MnO_2$ and $MnCO_3$; and at least one molten salt material selected from LiCl, KCl, $Li_2SO_4$, and $LiClO_4$, so as to obtain a mixture; calcining the mixture at a temperature not lower than 500° C. and not higher than 1000° C.; and washing the resultant calcined product to remove the molten salt material.

With the production method of the eighth aspect, it is possible to easily synthesize a negative electrode active material for lithium ion secondary batteries that exhibits a high filling density when processed into an electrode and that allows realization of a lithium ion secondary battery having high input characteristics.

A ninth aspect of the present invention provides the method for producing a negative electrode active material for lithium ion secondary batteries according to any one of the fifth to eighth aspects, in which the titanium oxide has an anatase type crystal structure. With the production method of the ninth aspect, since the reaction of titanium oxide having an anatase type crystal structure proceeds smoothly, the negative electrode active material for lithium ion secondary batteries can be synthesized more easily.

Hereinafter, embodiments of the negative electrode active material for lithium ion secondary batteries of the present invention and embodiments of the method for producing the negative electrode active material will be described with reference to the drawings.

First Embodiment

A first embodiment of the negative electrode active material for lithium ion secondary batteries of the present invention will be described. The negative electrode active material for lithium ion secondary batteries of the present embodiment includes a lithium-titanium composite oxide which has a composition represented by $Li_4Ti_{5-x}Fe_xO_{12}$ (where x satisfies $0<x\leq0.3$) and in which the average particle diameter of the primary particles (hereinafter, also referred to as a primary particle diameter) is not less than 1 µm. The lithium-titanium composite oxide is a substance in which part of Ti elements of $Li_4Ti_5O_{12}$ is substituted with Fe elements. In the above formula, x represents the amount of substitution with Fe elements (the added amount of Fe elements).

The inventors of the present application have found that a lithium-titanium composite oxide having a composition represented by $Li_4Ti_{5-x}Fe_xO_{12}$ (where x satisfies $0<x\leq0.3$) can improve input characteristics, compared to a lithium-titanium composite oxide having a composition represented by $Li_4Ti_5O_{12}$. However, it has been typical that the lithium-titanium composite oxide having a composition represented by $Li_4Ti_{5-x}Fe_xO_{12}$ (where x satisfies $0<x\leq0.3$) has a primary particle diameter not more than 1 µm. Therefore, there has been a problem in that the filling density cannot be made large when the lithium-titanium composite oxide having a composition represented by $Li_4Ti_{5-x}Fe_xO_{12}$ (where x satisfies $0<x\leq0.3$) is used to form an electrode.

In response, the inventors of the present application have found that improvement of the synthesis process can increase the primary particle diameter of the lithium-titanium composite oxide having a composition represented by $Li_4Ti_{5-x}Fe_xO_{12}$ (where x satisfies $0<x\leq0.3$), thereby improving the degree of filling of an electrode of a lithium ion secondary battery. In addition, it has been found that even when the lithium-titanium composite oxide having a composition represented by $Li_4Ti_{5-x}Fe_xO_{12}$ (where x satisfies $0<x\leq0.3$) has a primary particle diameter not less than 1 µm, input characteristics higher than those in the case of conventional $Li_4Ti_5O_{12}$ can be exhibited. Accordingly, if the lithium-titanium composite oxide of the present embodiment is used as a negative electrode material for a lithium ion secondary battery, it is possible to provide a lithium ion secondary battery that has both a high filling density of the electrode and high input characteristics.

The lithium-titanium composite oxide included in the negative electrode active material for lithium ion secondary batteries of the present embodiment has a spinel type crystal structure. The crystal structure can be confirmed by X-ray diffraction (XRD).

In the lithium-titanium composite oxide of the present embodiment, the added amount x of Fe elements satisfies $0<x\leq0.3$. The x needs to be larger than 0. However, the result of detailed consideration by the inventors of the present application has revealed that the dischargeable capacity of a lithium ion secondary battery using the negative electrode active material of the present embodiment tends to decrease with increase in the x, and that the decrease in the dischargeable capacity is remarkable when the x exceeds 0.3. From the standpoint of the electrode capacitance density, the added amount x of Fe elements more preferably satisfies $0<x\leq0.2$.

The average particle diameter d of the primary particles of the lithium-titanium composite oxide of the present embodiment is defined as follows. In a scanning electron microscope (SEM) photograph of the negative electrode active material taken by a SEM at an appropriate magnification, 30 particles are randomly selected from among the particles of the lithium-titanium composite oxide, and the particle diameter of the primary particle of each of the 30 particles (the length of the long side of a circumscribed rectangle that is circumscribed around the outer edge of the primary particle and that has the smallest area) is measured. The arithmetic mean value of the obtained measurement values is defined as the average particle diameter d.

The lithium-titanium composite oxide of the present embodiment may consist of the primary particles, or may include the secondary particles formed by aggregation of the primary particles. In either case, the average particle diameter d (μm) of the primary particles is not less than 1 μm. Excessive increase in the particle diameter tends to slightly deteriorate the input characteristics. Therefore, $1\leq d\leq5$ is preferably satisfied. However, depending on the intended use, the average particle diameter of the primary particles of the lithium-titanium composite oxide may be not less than 5 μm. Here, the term "primary particles" means particles that constitute a state (powder) where many particles exist or an aggregate, and that are the smallest units existing without breaking the bonds between molecules. The primary particles can be monocrystalline, polycrystalline, or amorphous. In addition, as described above, the secondary particle is a particle formed by aggregation of a plurality of the primary particles.

The lithium-titanium composite oxide of the present embodiment can be synthesized by mixing compounds that contain the constituent elements, and then calcining the mixture. Conventionally, a solid phase reaction method is generally used for synthesis of lithium-titanium composite oxides. Specifically, the lithium-titanium composite oxide can be produced by the following steps: the step of weighing a source of Li, titanium oxide, and a source of Fe in such proportions as to obtain an appropriate ratio, and uniformly mixing the weighed materials together to obtain a mixture; and the step of calcining the mixture. If an additive element other than Fe is further added, a material for the additive element may be additionally mixed with the source of Li, titanium oxide, and the source of Fe, and then the mixture may be calcined.

In the solid phase reaction method, LiOH, LiOH hydrate, $Li_2CO_3$, $Li_2SO_4$, LiF, and/or $Li_2O$ can be used as the source of Li. A monohydrate ($LiOH·H_2O$) is generally used as LiOH hydrate. However, LiOH hydrate having a different water content may be used. From the standpoint of the reaction temperature and the possibility of impurities remaining, it is preferable to use LiOH, LiOH hydrate, and/or $Li_2CO_3$. Titanium oxide having a rutile type crystal structure or an anatase type crystal structure can be used. From the standpoint of the smoothness of reaction, titanium oxide having an anatase type crystal structure is preferably used. As the source of Fe, FeO, $Fe_2O_3$, $Fe_3O_4$, $FeO_2$, α-FeOOH, $Fe(OH)_3$, $FeSO_4$, $Fe_2(SO_4)_3$, or the like can be used. From the standpoint of the reaction temperature, it is preferable to use $Fe_2O_3$ and/or α-FeOOH.

The calcining may be performed in an atmosphere of air, in an atmosphere of oxygen, or in an atmosphere of an inert gas such as nitrogen and argon. The calcining temperature depends on the source of Li, titanium oxide, the source of Fe, and the additive element material which are used, and on the retention time at the calcining temperature. If the mixture is calcined at a temperature about 900° C. or higher and about 1000° C. or lower, the lithium-titanium composite oxide of the present embodiment can be obtained.

The lithium-titanium composite oxide synthesized by the solid phase reaction method is likely to cause aggregation or sintering. In that case, the particle size distribution can be adjusted by carrying out a pulverization (crushing) step in addition to the above steps. Possible pulverization methods include pulverization methods using devices and instruments such as a jet mill, a bead mill, a ball mill, Mass Colloider, and a mortar. Among such methods, the pulverization method using a jet mill is useful because pulverization is performed by causing particles to collide with each other in an air current, and therefore the possibility of impurities being contained is low. However, if a material that has a small primary particle diameter and has a high aggregation strength is pulverized using a jet mill, the efficiency is reduced due to adhesion of the material to the inside of pipes of the jet mill, which leads to consumption of a lot of time and also to a poor yield.

The lithium-titanium composite oxide of the present embodiment can be synthesized also by a molten salt synthesis method. If the molten salt synthesis method is used, a material in which the degree of aggregation is small and which does not require a pulverization step can be synthesized, unlike in the case of the solid phase reaction method. Specifically, such a material can be produced by the following steps: the step of weighing a source of Li, titanium oxide, a source of Fe, and a molten salt material in such proportions as to obtain an appropriate ratio, and uniformly mixing the weighed materials together to obtain a mixture; the step of calcining the mixture; and the step of washing the calcined product to remove the molten salt. In the calcining step, the reaction proceeds in the molten salt which is liquid at the calcining temperature, and the resultant product remains in the molten salt even after the reaction. Therefore, contact between one particle and other particles is less likely to occur, and a negative electrode active material in which the degree of aggregation or sintering is small can be synthesized.

Also in the molten salt synthesis method, LiOH, LiOH hydrate, $Li_2CO_3$, $Li_2SO_4$, LiF, and/or $Li_2O$ can be used as the source of Li. A monohydrate ($LiOH·H_2O$) is generally used as LiOH hydrate. However, LiOH hydrate having a different water content may be used. From the standpoint of the reaction temperature and the possibility of impurities remaining, it is preferable to use LiOH, LiOH hydrate, and/or $Li_2CO_3$. Titanium oxide having a rutile type crystal structure or an anatase type crystal structure can be used. From the standpoint of the smoothness of reaction, titanium oxide having an anatase type crystal structure is preferably used. As the source of Fe, FeO, $Fe_2O_3$, $Fe_3O_4$, $FeO_2$, α-FeOOH, $Fe(OH)_3$, $FeSO_4$, $Fe_2(SO_4)_3$, or the like can be used. From the standpoint of the reaction temperature, it is preferable to use $Fe_2O_3$ and/or α-FeOOH. The molten salt material may be any compound that has a relatively low melting point and that is capable of being removed by the washing step. In order to facilitate the progress of reaction, a compound containing Li element is preferred, and, for example, LiCl, $Li_2SO_4$, $LiClO_4$, or the like, can be used. Alternatively, KCl, a mixture of LiCl and KCl, or the like, can also be used.

The calcining may be performed in an atmosphere of air, in an atmosphere of oxygen, or in an atmosphere of an inert gas such as nitrogen and argon. The calcining temperature depends on the source of Li, titanium oxide, the source of Fe, and the additive element material which are used. If the mixture is calcined at a temperature not lower than the melting point of the molten salt used, the lithium-titanium composite oxide of the present embodiment can be obtained. For example, the calcining temperature can be a temperature not lower than 500° C. and not higher than 1000° C.

In the washing step, the calcined product can easily be washed by using a liquid that dissolves the molten salt. For example, when LiCl, KCl, or a mixture of LiCl and KCl is used as the molten salt, the molten salt can be dissolved with water. In order to prevent impurity elements from being contained in the active material, pure water or ion-exchange water is preferably used.

The lithium-titanium composite oxide included in the negative electrode active material for lithium ion secondary batteries of the present embodiment has a large primary particle diameter, and thus the filling density of the negative electrode active material in a negative electrode can be enhanced. In addition, since the lithium-titanium composite oxide included in the negative electrode active material for lithium ion secondary batteries of the present embodiment has a composition represented by $Li_4Ti_{5-x}Fe_xO_{12}$ (where x satisfies $0<x\leq0.3$), high input characteristics can be realized even when the particle diameter is large. Therefore, the negative electrode active material for lithium ion secondary batteries of the present embodiment allows realization of a lithium ion secondary battery that has both a high filling density of the negative electrode active material in the negative electrode and high input characteristics.

Second Embodiment

A second embodiment of the negative electrode active material for lithium ion secondary batteries of the present invention will be described. The negative electrode active material for lithium ion secondary batteries of the present embodiment includes a lithium-titanium composite oxide which has a composition represented by $Li_4Ti_{5-y}Mn_yO_{12}$ (where y satisfies $0<y\leq0.3$) and in which the average particle diameter of the primary particles is not less than 1 μm. The lithium-titanium composite oxide is a substance in which part of Ti elements of $Li_4Ti_5O_{12}$ is substituted with Mn elements. In the above formula, y represents the amount of substitution with Mn elements (the added amount of Mn elements).

The inventors of the present application have found that a lithium-titanium composite oxide having a composition represented by $Li_4Ti_{5-y}Mn_yO_{12}$ (where y satisfies $0<y\leq0.3$) can improve input characteristics, compared to a lithium-titanium composite oxide having a composition represented by $Li_4Ti_5O_{12}$. However, it has been typical that the lithium-titanium composite oxide having a composition represented by $Li_4Ti_{5-y}Mn_yO_{12}$ (where y satisfies $0<y\leq0.3$) has a primary particle diameter not more than 1 μm. Therefore, there has been a problem in that the filling density cannot be made large when the lithium-titanium composite oxide is used to form an electrode.

In response, the inventors of the present application have found that improvement of the synthesis process can increase the primary particle diameter of the lithium-titanium composite oxide having a composition represented by $Li_4Ti_{5-y}Mn_yO_{12}$ (where y satisfies $0<y\leq0.3$), thereby improving the degree of filling of an electrode of a lithium ion secondary battery. In addition, it has been found that even when the lithium-titanium composite oxide having a composition represented by $Li_4Ti_{5-y}Mn_yO_{12}$ (where y satisfies $0<y\leq0.3$) has a primary particle diameter not less than 1 μm, input characteristics higher than those in the case of conventional $Li_4Ti_5O_{12}$ can be exhibited. Accordingly, if the lithium-titanium composite oxide of the present embodiment is used as a negative electrode material for a lithium ion secondary battery, it is possible to provide a lithium ion secondary battery that has both a high filling density of the electrode and high input characteristics.

The lithium-titanium composite oxide included in the negative electrode active material for lithium ion secondary batteries of the present embodiment has a spinel type crystal structure. The crystal structure can be confirmed by X-ray diffraction (XRD).

In the lithium-titanium composite oxide of the present embodiment, the added amount y of Mn elements satisfies $0<y\leq0.3$. That is, the y needs to be larger than 0. However, the result of detailed consideration by the inventors of the present application has revealed that the dischargeable capacity of a lithium ion secondary battery using the negative electrode active material of the present embodiment tends to decrease with increase in the y, and that the decrease in the dischargeable capacity is remarkable when the y exceeds 0.3. From the standpoint of the electrode capacitance density, the added amount y of Mn elements more preferably satisfies $0<y\leq0.2$.

The average particle diameter d of the primary particles of the lithium-titanium composite oxide of the present embodiment is as defined in the first embodiment.

The lithium-titanium composite oxide of the present embodiment may consist of the primary particles, or may include the secondary particles formed by aggregation of the primary particles. In either case, the average particle diameter d (μm) of the primary particles is not less than 1 μm. The average particle diameter d is preferably more than 1.5 μm. However, excessive increase in the particle diameter tends to slightly deteriorate the input characteristics. Therefore, the average particle diameter d is preferably not more than 5 μm. That is, d preferably satisfies $1\leq d\leq5$, and more preferably satisfies $1.5<d\leq5$. However, depending on the intended use, the average particle diameter of the primary particles of the lithium-titanium composite oxide may be not less than 5 μm.

The lithium-titanium composite oxide of the present embodiment can be synthesized by mixing compounds that contain the constituent elements and then calcining the mixture. Conventionally, a solid phase reaction method is generally used for synthesis of lithium-titanium composite oxides. Specifically, the lithium-titanium composite oxide can be produced by the following steps: the step of weighing a source of Li, titanium oxide, and a source of Mn in such proportions as to obtain an appropriate ratio, and uniformly mixing the weighed materials together to obtain a mixture; and the step of calcining the mixture. If an additive element other than Mn is further added, a material for the additive element may be additionally mixed with the source of Li, titanium oxide, and the source of Mn, and then the mixture may be calcined.

In the solid phase reaction method, LiOH, LiOH hydrate, $Li_2CO_3$, $Li_2SO_4$, LiF, and/or $Li_2O$ can be used as the source of Li. A monohydrate ($LiOH.H_2O$) is generally used as LiOH hydrate. However, LiOH hydrate having a different water content may be used. From the standpoint of the reaction temperature and the possibility of impurities remaining, it is preferable to use LiOH, LiOH hydrate, and/or $Li_2CO_3$. Titanium oxide having a rutile type crystal structure or an anatase type crystal structure can be used. From the standpoint of the smoothness of reaction, titanium oxide having an anatase type crystal structure is preferably used. As the source of Mn, MnO, $Mn_3O_4$, $MnO_2$, $Mn(OH)_2$, $MnCO_3$, $MnSO_4$, or the like can be used. From the standpoint of the reaction temperature, it is preferable to use $MnO_2$ and/or $MnCO_3$.

The calcining may be performed in an atmosphere of air, in an atmosphere of oxygen, or in an atmosphere of an inert gas such as nitrogen and argon. The calcining temperature depends on the source of Li, titanium oxide, the source of Mn, and the additive element material which are used, and on the retention time at the calcining temperature. If the mixture is calcined at a temperature about 900° C. or higher and about 1000° C. or lower, the lithium-titanium composite oxide of the present embodiment can be obtained.

The lithium-titanium composite oxide synthesized by the solid phase reaction method is likely to cause aggregation or sintering. In that case, the particle size distribution can be adjusted by carrying out a pulverization (crushing) step in addition to the above steps. Possible pulverization methods include pulverization methods using devices and instruments such as a jet mill, a bead mill, a ball mill, Mass Colloider, and a mortar. Among such methods, the pulverization method using a jet mill is useful because pulverization is performed by causing particles to collide with each other in an air current, and therefore the possibility of impurities being contained is low. However, if a material that has a small primary particle diameter and has a high aggregation strength is pulverized using a jet mill, the efficiency is reduced due to adhesion of the material to the inside of pipes of the jet mill, which leads to consumption of a lot of time and also to a poor yield.

The lithium-titanium composite oxide of the present embodiment can be synthesized also by a molten salt synthesis method. If the molten salt synthesis method is used, a material in which the degree of aggregation is small and which does not require a pulverization step can be synthesized, unlike in the case of the solid phase reaction method. Specifically, such a material can be produced by the following steps: the step of weighing a source of Li, titanium oxide, a source of Mn, and a molten salt material in such proportions as to obtain an appropriate ratio, and uniformly mixing the weighed materials together to obtain a mixture; the step of calcining the mixture; and the step of washing the calcined product to remove the molten salt. In the calcining step, the reaction proceeds in the molten salt which is liquid at the calcining temperature, and the resultant product remains in the molten salt even after the reaction. Therefore, contact between one particle and other particles is less likely to occur, and a lithium-titanium composite oxide in which the degree of aggregation or sintering is small can be synthesized.

Also in the molten salt synthesis method, LiOH, LiOH hydrate, $Li_2CO_3$, $Li_2SO_4$, LiF, and/or $Li_2O$ can be used as the source of Li. A monohydrate ($LiOH.H_2O$) is generally used as LiOH hydrate. However, LiOH hydrate having a different water content may be used. From the standpoint of the reaction temperature and the possibility of impurities remaining, it is preferable to use LiOH, LiOH hydrate, and/or $Li_2CO_3$. Titanium oxide having a rutile type crystal structure or an anatase type crystal structure can be used. From the standpoint of the smoothness of reaction, titanium oxide having an anatase type crystal structure is preferably used. As the source of Mn, MnO, $Mn_3O_4$, $MnO_2$, $Mn(OH)_2$, $MnCO_3$, $MnSO_4$, or the like can be used. From the standpoint of the reaction temperature, it is preferable to use $MnO_2$ and/or $MnCO_3$. The molten salt material may be any compound that has a relatively low melting point and that is capable of being removed by the washing step. In order to facilitate the progress of reaction, a compound containing Li element is preferred, and, for example, LiCl, $Li_2SO_4$, $LiClO_4$, or the like, can be used. Alternatively, KCl, a mixture of LiCl and KCl, or the like, can also be used.

The calcining may be performed in an atmosphere of air, in an atmosphere of oxygen, or in an atmosphere of an inert gas such as nitrogen and argon. The calcining temperature depends on the source of Li, titanium oxide, the source of Mn, and the additive element material which are used. If the mixture is calcined at a temperature not lower than the melting point of the molten salt used, the lithium-titanium composite oxide of the present embodiment can be obtained.

In the washing step, the calcined product can easily be washed by using a liquid that dissolves the molten salt. For example, when LiCl, KCl, or a mixture of LiCl and KCl is used as the molten salt, the molten salt can be dissolved with water. In order to prevent impurity elements from being contained in the active material, pure water or ion-exchange water is preferably used.

The lithium-titanium composite oxide included in the negative electrode active material for lithium ion secondary batteries of the present embodiment has a large primary particle diameter, and thus the filling density of the negative electrode active material in a negative electrode can be enhanced. In addition, since the lithium-titanium composite oxide included in the negative electrode active material for lithium ion secondary batteries of the present embodiment has a composition represented by $Li_4Ti_{5-y}Mn_yO_{12}$ (where y satisfies $0<y\leq0.3$), high input characteristics can be realized even when the particle diameter is large. Therefore, the negative electrode active material for lithium ion secondary batteries of the present embodiment allows realization of a lithium ion secondary battery that has both a high filling density of the negative electrode active material in the negative electrode and high input characteristics.

EXAMPLES

The lithium-titanium composite oxide included in the negative electrode active material for lithium ion secondary batteries of the present invention was synthesized, and was examined for various characteristics. The results will be described below.

1. Synthesis

Example 1

A lithium-titanium composite oxide of Example 1 was synthesized using a solid phase reaction method.

Material powders of $LiOH.H_2O$, $TiO_2$, and $Fe_2O_3$ were weighed so that the molar mixing ratio Li/Ti/Fe was 4/(5−x)/x where x=0.3, and these material powders were put into a mortar and mixed. $TiO_2$ which was used as a material had an anatase type crystal structure, and had an average particle diameter of about 0.3 µm. The mixed material powders were put into a crucible made of $Al_2O_3$, and were calcined in an electric furnace in an atmosphere of air. The calcining temperature was 950° C., and the retention time at the calcining temperature was 12 hours. The calcined material was taken from the crucible, and pulverized with the mortar to obtain an intended lithium-titanium composite oxide.

Example 2

A lithium-titanium composite oxide of Example 2 was synthesized using a solid phase reaction method.

Material powders of $LiOH.H_2O$, $TiO_2$, and $MnO_2$ were weighed so that the molar mixing ratio Li/Ti/Mn was 4/(5− y)/y where y=0.3, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 950° C., and the retention time at the calcining temperature was 12 hours. The calcined material was taken from the crucible, and pulverized with the mortar to obtain an intended lithium-titanium composite oxide.

Example 3

A lithium-titanium composite oxide of Example 3 was synthesized using a solid phase reaction method.

Material powders of $LiOH \cdot H_2O$, $TiO_2$, and $Fe_2O_3$ were weighed so that the molar mixing ratio Li/Ti/Fe was 4/(5−x)/x where x=0.2, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

Example 4

A lithium-titanium composite oxide of Example 4 was synthesized using a solid phase reaction method.

Material powders of $LiOH \cdot H_2O$, $TiO_2$, and $Fe_2O_3$ were weighed so that the molar mixing ratio Li/Ti/Fe was 4/(5−x)/x where x=0.3, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

Example 5

A lithium-titanium composite oxide of Example 5 was synthesized using a solid phase reaction method.

Material powders of $LiOH \cdot H_2O$, $TiO_2$, and $MnO_2$ were weighed so that the molar mixing ratio Li/Ti/Mn was 4/(5−y)/y where y=0.1, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

Example 6

A lithium-titanium composite oxide of Example 6 was synthesized using a solid phase reaction method.

Material powders of $LiOH \cdot H_2O$, $TiO_2$, and $MnO_2$ were weighed so that the molar mixing ratio Li/Ti/Mn was 4/(5−y)/y where y=0.2, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

Example 7

A lithium-titanium composite oxide of Example 7 was synthesized using a solid phase reaction method.

Material powders of $LiOH \cdot H_2O$, $TiO_2$, and $MnO_2$ were weighed so that the molar mixing ratio Li/Ti/Mn was 4/(5−y)/y where y=0.3, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

Comparative Example 1

A lithium-titanium composite oxide of Comparative Example 1 was synthesized using a solid phase reaction method.

Material powders of $LiOH \cdot H_2O$ and $TiO_2$ were weighed so that the molar mixing ratio Li/Ti was 4/5, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 850° C., and the retention time at the calcining temperature was 12 hours. The calcined material was taken from the crucible, and pulverized with the mortar to obtain an intended lithium-titanium composite oxide.

Comparative Example 2

A lithium-titanium composite oxide of Comparative Example 2 was synthesized using a solid phase reaction method.

Material powders of $LiOH \cdot H_2O$, $TiO_2$, and $Fe_2O_3$ were weighed so that the molar mixing ratio Li/Ti/Fe was 4/(5−x)/x where x=0.3, and these material powders were put into a mortar and mixed. $TiO_2$ which was used as a material had an anatase type crystal structure, and had an average particle diameter of about 0.3 μm. The mixed material powders were put into a crucible made of $Al_2O_3$, and were calcined in an electric furnace in an atmosphere of air. The calcining temperature was 850° C., and the retention time at the calcining temperature was 12 hours. The calcined material was taken from the crucible, and pulverized with the mortar to obtain an intended lithium-titanium composite oxide.

Comparative Example 3

A lithium-titanium composite oxide of Comparative Example 3 was synthesized using a solid phase reaction method.

Material powders of LiOH.H$_2$O, TiO$_2$, and MnO$_2$ were weighed so that the molar mixing ratio Li/Ti/Mn was 4/(5−y)/y where y=0.3, and these material powders were put into a mortar and mixed. TiO$_2$ which was used as a material had an anatase type crystal structure, and had an average particle diameter of about 0.3 μm. The mixed material powders were put into a crucible made of Al$_2$O$_3$, and were calcined in an electric furnace in an atmosphere of air. The calcining temperature was 850° C., and the retention time at the calcining temperature was 12 hours. The calcined material was taken from the crucible, and pulverized with the mortar to obtain an intended lithium-titanium composite oxide.

Comparative Example 4

A lithium-titanium composite oxide of Comparative Example 4 was synthesized using a solid phase reaction method.

Material powders of LiOH.H$_2$O and TiO$_2$ were weighed so that the molar mixing ratio Li/Ti was 4/5, and these material powders were put into a mortar and mixed. TiO$_2$ which was used as a material had an anatase type crystal structure, and had an average particle diameter of about 0.3 μm. The mixed material powders were put into a crucible made of Al$_2$O$_3$, and were calcined in an electric furnace in an atmosphere of air. The calcining temperature was 950° C., and the retention time at the calcining temperature was 12 hours. The calcined material was taken from the crucible, and pulverized with the mortar to obtain an intended lithium-titanium composite oxide.

Comparative Example 5

A lithium-titanium composite oxide of Comparative Example 5 was synthesized using a solid phase reaction method.

Material powders of LiOH.H$_2$O and TiO$_2$ were weighed so that the molar mixing ratio Li/Ti was 4/5, and these material powders were put into a mortar and mixed. TiO$_2$ which was used as a material had an anatase type crystal structure, and had an average particle diameter of about 0.3 μm. The mixed material powders were put into a crucible made of Al$_2$O$_3$, and were calcined in an electric furnace in an atmosphere of air. The calcining temperature was 900° C., and the retention time at the calcining temperature was 12 hours. The calcined material was taken from the crucible, and pulverized with the mortar to obtain an intended lithium-titanium composite oxide.

2. Confirmation of Crystal Structure

Powder X-ray diffraction (XRD) measurements were carried out in order to confirm the crystal structures of the lithium-titanium composite oxides of Examples 1 to 7 and Comparative Examples 1 to 5. An XRD measurement apparatus manufactured by Rigaku Corporation was used for the measurements.

Figure 1:
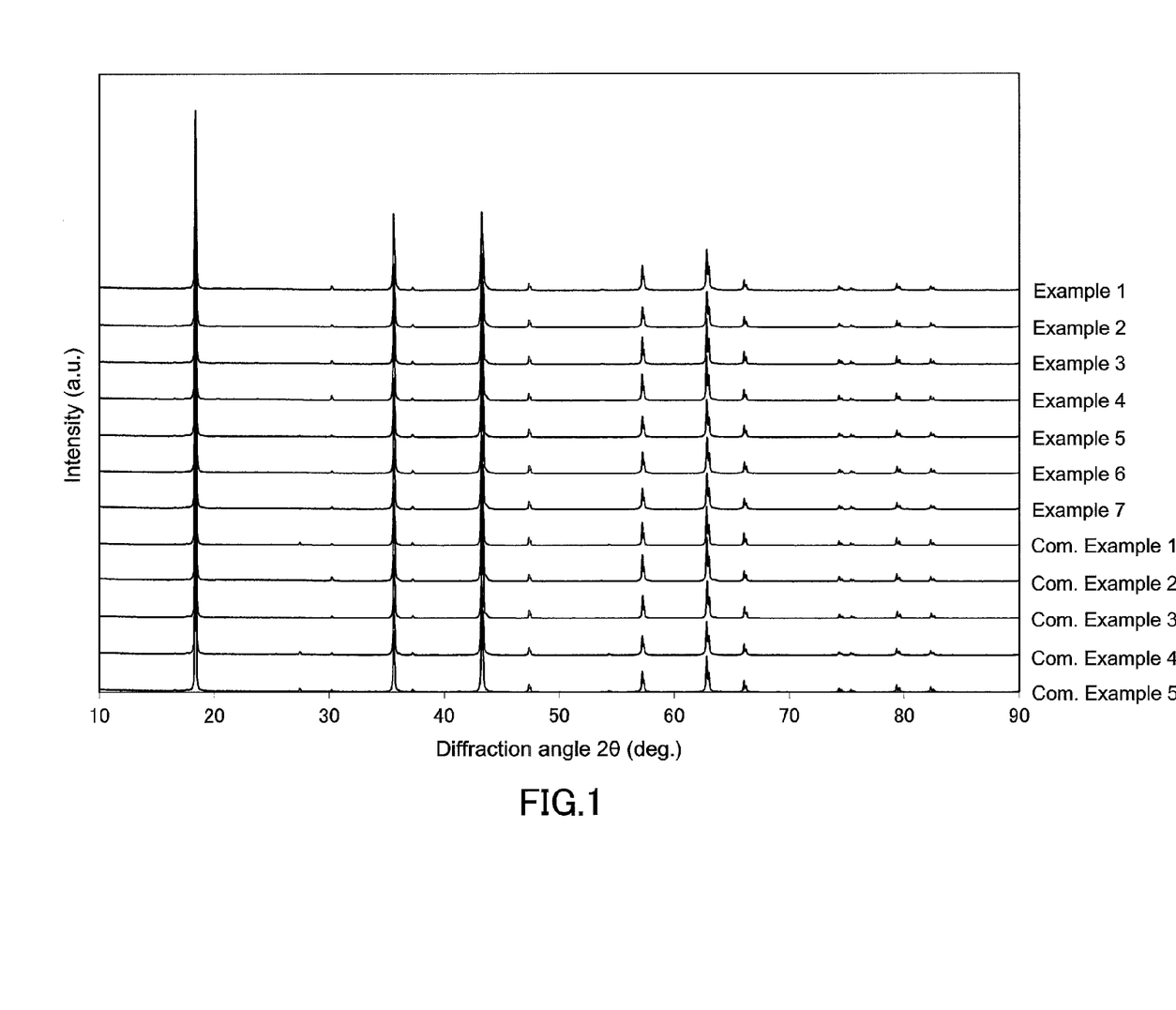
FIG. 1 shows X-ray diffraction patterns of lithium-titanium composite oxides of Examples 1 to 7 and Comparative Examples 1 to 5.
Figure 2:
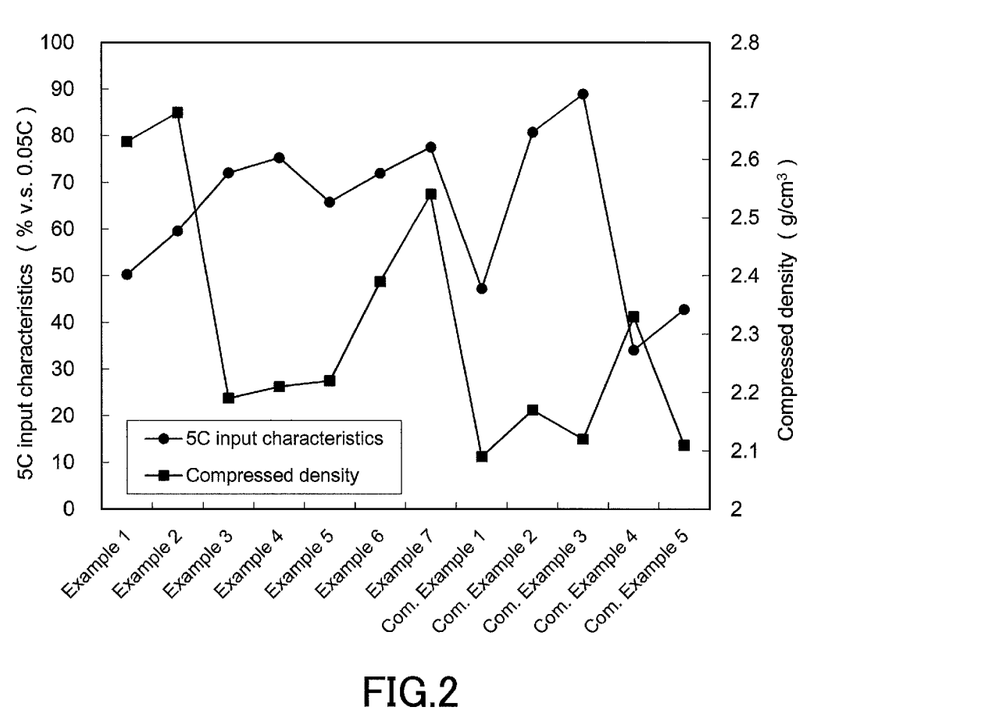
FIG. 2 is a diagram showing the compressed densities and the input characteristics of batteries including active materials of Examples 1 to 7 and Comparative Examples 1 to 5.

Profiles of the results of the XRD measurements are shown in FIG. 1. In addition, the added amount x of Fe, the added amount y of Mn, and the calcining temperature in each of Examples and Comparative Examples are collectively shown in Table 1.

TABLE 1

| | Added amount of Fe (x) | Added amount of Mn (y) | Calcining temperature (° C.) |
|---|---|---|---|
| Example 1 | 0.3 | 0 | 950 |
| Example 2 | 0 | 0.3 | 950 |
| Example 3 | 0.2 | 0 | 900 |
| Example 4 | 0.3 | 0 | 900 |
| Example 5 | 0 | 0.1 | 900 |
| Example 6 | 0 | 0.2 | 900 |
| Example 7 | 0 | 0.3 | 900 |
| Comparative Example 1 | 0 | 0 | 850 |
| Comparative Example 2 | 0.3 | 0 | 850 |
| Comparative Example 3 | 0 | 0.3 | 850 |
| Comparative Example 4 | 0 | 0 | 950 |
| Comparative Example 5 | 0 | 0 | 900 |

It can be confirmed from FIG. 1 that the lithium-titanium composite oxides of Examples 1 to 7 and Comparative Examples 1 to 5 each had a spinel type crystal structure. For the lithium-titanium composite oxides of Comparative Examples 1, 4, and 5, peaks representing a very slight amount of TiO$_2$ (rutile type structure) were observed at around 28° and 55°, in addition to peaks representing the phase of spinel type structure. This shows that TiO$_2$ (rutile type structure) was contained to the extent that no large influence would be exerted on the battery performance. By contrast, for the lithium-titanium composite oxides of Examples 1 to 7 and Comparative Examples 2 and 3, peaks representing TiO$_2$ (rutile type structure) were not observed, and only peaks representing the phase of spinel type structure were observed. From this result, it was found that adding Fe or Mn has the effect of suppressing production and remaining of TiO$_2$ (rutile type structure).

3. Confirmation of Average Particle Diameter

The average particle diameters of the primary particles of the lithium-titanium composite oxides of Examples 1 to 7 and Comparative Examples 1 to 5 were evaluated based on "average particle diameter d" defined below. Any 30 particles were randomly selected from a SEM photograph, the particle diameter of the primary particle of each of the 30 particles (the length of the long side of a circumscribed rectangle that is circumscribed around the outer edge of the primary particle and that has the smallest area) was measured, and the average was calculated to estimate the "average particle diameter d".

In general, "cumulative average particle diameter d$_{50}$" in a particle size distribution measurement is often used as the average diameter. However, the particle size distribution measurement is intended to measure the size of aggregated particles (secondary particles) instead of the size of primary particles. The size of primary particles and the size of secondary particles are not correlated with each other. Therefore, the "average particle diameter d" which is a measure indicating the size of primary particles is suitable for showing the effect of the present invention.

Observation was performed with a SEM to examine the "average particle diameters d" of the lithium-titanium composite oxides of Examples 1 to 7 and Comparative Examples 1 to 5 for which a single phase of spinel type structure was obtained. An apparatus manufactured by Hitachi High-Technologies Corporation was used for this observation.

The average particle diameters d of the lithium-titanium composite oxides of Examples 1 to 7 and Comparative Examples 1 to 5 which were calculated using SEM photographs are shown in Table 2.

TABLE 2

| | Average particle diameter d μm | Compressed density g/cm³ | 5 C input characteristics % v.s. 0.05 C |
|---|---|---|---|
| Example 1 | 2.48 | 2.63 | 50.3 |
| Example 2 | 2.83 | 2.68 | 59.6 |
| Example 3 | 1.29 | 2.19 | 72.1 |
| Example 4 | 1.48 | 2.21 | 75.3 |
| Example 5 | 1.53 | 2.22 | 65.8 |
| Example 6 | 2.05 | 2.39 | 72.0 |
| Example 7 | 2.32 | 2.54 | 77.6 |
| Comparative Example 1 | 0.77 | 2.09 | 47.3 |
| Comparative Example 2 | 0.87 | 2.17 | 80.8 |
| Comparative Example 3 | 0.71 | 2.12 | 89.0 |
| Comparative Example 4 | 2.02 | 2.33 | 34.1 |
| Comparative Example 5 | 0.94 | 2.11 | 42.8 |

When the lithium-titanium composite oxides having the same composition ($Li_4Ti_{4.7}Fe_{0.3}O_{12}$) are compared with each other, the average particle diameter d of the lithium-titanium composite oxide of Comparative Example 2 for which the calcining temperature was 850° C. is 0.87 μm, while the average particle diameter d of the lithium-titanium composite oxide of Example 4 for which the calcining temperature was 900° C. is 1.48 μm, and the average particle diameter d of the lithium-titanium composite oxide of Example 1 for which the calcining temperature was 950° C. is 2.48 μm. In addition, when the lithium-titanium composite oxides having the same composition ($Li_4Ti_{4.7}Mn_{0.3}O_{12}$) are compared with each other, the average particle diameter d of the lithium-titanium composite oxide of Comparative Example 3 for which the calcining temperature was 850° C. is 0.71 μm, while the average particle diameter d of the lithium-titanium composite oxide of Example 7 for which the calcining temperature was 900° C. is 2.32 μm, and the average particle diameter d of the lithium-titanium composite oxide of Example 2 for which the calcining temperature was 950° C. is 2.83 μm. These results have revealed that raising the calcining temperature has the effect of increasing the primary particle diameters.

4. Measurement of Compressed Density

For the lithium-titanium composite oxides of Examples 1 to 7 and Comparative Examples 1 to 5, the compression densities were measured as indicators of the degree of filling exhibited when the lithium-titanium composite oxides were processed into electrodes. A powder resistance measurement system manufactured by Mitsubishi Chemical Analytech Co., Ltd. was used for the measurement. The density at the time of application of a pressure of 64 MPa was defined as the compressed density.

The measurement results are shown in Table 2. The results for the average particle diameters d and the compressed densities have revealed that a lithium-titanium composite oxide that has a large average particle diameter d tends to have a large compressed density.

5. Fabrication of Electrodes

Electrodes were fabricated using the lithium-titanium composite oxides of Examples 1 to 7 and Comparative Examples 1 to 5 as active materials. An active material, a conductive material, and a binder were weighed so that the weight ratio, active material/conductive material/binder, was 100/15/5, and were kneaded to fabricate a paste. Acetylene black was used as the conductive material, polyvinylidene fluoride (PVdF) was used as the binder, and N-methyl-2-pyrrolidone (NMP) was used as a solvent. "Awatori Rentaro" manufactured by Thinky Corporation was used for the kneading. The fabricated paste was applied onto a collector formed of an aluminum foil, and was dried in an electric furnace maintaining a temperature of 100° C. The product obtained after drying was flattened with a roller, and was stamped out into an electrode having a pellet shape.

6. Fabrication of Batteries

In order to examine the characteristics as negative electrode active materials for lithium ion secondary batteries, batteries were fabricated using the above electrodes. In general, a lithium-transition metal composite oxide such as $LiCoO_2$ is used (a lithium-transition metal composite oxide containing a transition metal such as Co, Mn, and Ni is generally used) as a positive electrode active material for a lithium ion secondary battery. However, in order to examine the characteristics of the negative electrode active materials themselves without depending on positive electrode active materials, metallic Li was used for the counter electrode, instead of a generally-used positive electrode active material. Such a method is often used for evaluation of active materials.

Coin-shaped batteries were fabricated. Each of the above electrodes fabricated using Examples and Comparative Examples, a separator impregnated with an electrolyte solution, and a plate of metallic Li, were stacked in this order, and put into a coin-shaped casing. The casing was sealed to make a battery. Two microporous PE membranes manufactured by Asahi Kasei E-materials Corp. were stacked to each other, and used as the separator. A solution was prepared by dissolving 1 mol/L of $LiPF_6$ in a solvent obtained by mixing EC (ethylene carbonate) and EMC (ethyl methyl carbonate) so that EC/EMC was 1/3, and the solution was used as the electrolyte solution.

The batteries fabricated using the lithium-titanium composite oxides of Examples 1 to 7 and Comparative Examples 1 to 5 as active materials are referred to as batteries including the active materials of Examples 1 to 7 and Comparative Examples 1 to 5.

7. Evaluation of Input Characteristics

In order to examine the input characteristics, charge rate characteristics were evaluated using the fabricated batteries described above. An electrochemical measurement system manufactured by Solartron was used, and the voltage range for charge and discharge was from 1 V to 3 V. Constant-current discharge was performed at a 1 C rate, and then discharge was performed with a constant voltage of 3 V until the current value reached a value corresponding to 0.05 C rate. The current rate at the time of charge performed after discharge was set to 0.05 C or 5 C, and measurements were carried out for both of the current rates. The chargeable capacities at 5 C rate were compared with the chargeable capacities at 0.05 C rate.

The measurement results of the input characteristics are shown in Table 2. From the measurement results for the batteries including the active materials of Comparative Examples 1 to 3, and 5, it can be understood that the input characteristics are greatly improved by substituting part of Ti elements with Fe elements or Mn elements while keeping conventional particle diameters. In addition, as can be understood from the measurement results for the batteries including the active materials of Comparative Examples 1, 4, and 5, the input characteristics deteriorate if the calcining temperature is raised. For this result, it can be thought that, due to low electron conductivity or low Li ion conductivity of $Li_4Ti_5O_{12}$, sharp increase in the particle diameters causes electrons or Li ions to take a long time to diffuse in the particles, thereby deteriorating the input characteristics at high load.

By contrast, as can be understood from the measurement results for the batteries including the active materials of Examples 1 to 7, in the case where part of Ti elements were substituted with Fe elements or Mn elements, even when the particle diameter was large and 1 μm or more, the input characteristics indicated a very high value of 50% or more. This is thought to be because the electron conductivity or the Li ion conductivity becomes high as a result of substitution of part of Ti elements with Fe elements or Mn elements, and thus electrons or Li ions can sufficiently diffuse in the particles even when the particle diameter is increased.

The negative electrode active material for lithium ion secondary batteries of the present invention can realize a high filling density when processed into an electrode, and also allows providing a lithium ion secondary battery excellent in the input characteristics. Therefore, the negative electrode active material for lithium ion secondary batteries of the present invention is useful as a negative electrode active material for lithium ion secondary batteries used for large batteries, electric cars, etc., and also can be applied to mobile equipment.

It should be noted that the specific embodiments and Examples presented in DETAILED DESCRIPTION OF THE INVENTION are only intended to clarify the technical contents of the present invention, and the present invention should not be restrictively construed based on only the specific examples. The present invention can be carried out by making various modifications within the spirit of the present invention and the scope of the claims provided below.

What is claimed is:

1. A negative electrode active material for lithium ion secondary batteries, the negative electrode active material comprising a lithium-titanium composite oxide which has a composition represented by $Li_4Ti_{5-x}Fe_xO_{12}$ (where x satisfies $0<x\leq0.3$) or $Li_4Ti_{5-y}Mn_yO_{12}$ (where y satisfies $0<y\leq0.3$) and in which primary particles have an average particle diameter not less than 1 μm.

2. The negative electrode active material for lithium ion secondary batteries according to claim 1, wherein the x satisfies $0<x\leq0.2$.

3. The negative electrode active material for lithium ion secondary batteries according to claim 1, wherein the y satisfies $0<y\leq0.2$.

4. The negative electrode active material for lithium ion secondary batteries according to claim 1, wherein the average particle diameter of the primary particles of the lithium-titanium composite oxide is not less than 1 μm and not more than 5 μm.

5. A lithium ion secondary battery comprising:
a positive electrode;
a negative electrode containing an active material according to claim 1; and
the separator interposed between the positive electrode and the negative electrode.

* * * * *